(12) United States Patent
Le et al.

(10) Patent No.: US 11,868,950 B2
(45) Date of Patent: Jan. 9, 2024

(54) SYSTEMS AND METHODS FOR DETERMINING DUTY COSTS ASSOCIATED WITH A SUPPLY CHAIN NETWORK

(71) Applicant: Coupa Software Incorporated, San Mateo, CA (US)

(72) Inventors: Tung Hoang Le, Waterloo (CA); Zheng Ouyang, Ann Arbor, MI (US); Seyed Ali Taghavi Behbahani, Ann Arbor, MI (US); Gary Robert Strickler, Jr., Ann Arbor, MI (US)

(73) Assignee: Coupa Software Incorporated, San Mateo, CA (US)

( * ) Notice: Subject to any disclaimer, the term of this patent is extended or adjusted under 35 U.S.C. 154(b) by 135 days.

(21) Appl. No.: 17/185,942

(22) Filed: Feb. 25, 2021

(65) Prior Publication Data
US 2022/0270043 A1    Aug. 25, 2022

(51) Int. Cl.
*G06Q 10/08*    (2023.01)
*G06Q 10/0834*    (2023.01)

(52) U.S. Cl.
CPC .............................. *G06Q 10/08345* (2013.01)

(58) Field of Classification Search
CPC ...................................................... G06Q 10/08
See application file for complete search history.

(56) References Cited

U.S. PATENT DOCUMENTS 8,214,238 B1    7/2012 Fairfield et al.
8,266,066 B1    9/2012 Wezter et al.
2001/0032029 A1    10/2001 Kauffman
2002/0156663 A1*    10/2002 Weber .............. G06Q 10/06375
705/7.11

(Continued)

FOREIGN PATENT DOCUMENTS

CN    110991056 A    4/2020
WO    2002077917 A1    10/2002

OTHER PUBLICATIONS

Antonio Carlos Braz, The bullwhip effect in closed-loop supply chains: A systematic literature review. Aug. 6, 2018, Journal of Cleaner Production (Year: 2018).*

(Continued)

*Primary Examiner* — Resha Desai
*Assistant Examiner* — Ismail A Manejwala
(74) *Attorney, Agent, or Firm* — Baker Botts L.L.P.

(57) ABSTRACT

Input data provides an order of a quantity of finished goods to a site. Software is programmed for: accessing data defining an architecture of the supply chain network with sites, and a location of each site; enumerating one or more path solutions along the supply chain network to fulfill the order, each path solution comprising path fragments connecting two sites, a path fragment defining movement of a sub-quantity of the finished goods or raw materials; determining a cost associated with each of the plurality of path fragments, the cost comprising a duty rate, the duty rate associated with a particular path fragment based on the locations of the two sites connected by the particular path fragment and the sub-quantity of the finished goods or finished goods raw materials moved between the two sites; determining one or more optimal path solutions; and outputting the optimal path solutions for display.

17 Claims, 11 Drawing Sheets

(56) References Cited

U.S. PATENT DOCUMENTS

| | | | |
|---|---|---|---|
| 2005/0171827 A1* | 8/2005 | Denton | G06Q 10/06312 |
| | | | 705/7.29 |
| 2006/0282346 A1 | 12/2006 | Kernodle et al. | |
| 2008/0015721 A1 | 1/2008 | Spearman | |
| 2009/0150208 A1 | 6/2009 | Rhodes et al. | |
| 2009/0319070 A1 | 12/2009 | Morningred et al. | |
| 2009/0327027 A1 | 12/2009 | Bateni et al. | |
| 2011/0098834 A1 | 4/2011 | Couronne et al. | |
| 2011/0130857 A1 | 6/2011 | Budiman | |
| 2011/0173042 A1* | 7/2011 | Riepshoff | G06Q 10/06316 |
| | | | 705/28 |
| 2011/0282476 A1 | 11/2011 | Hegemier et al. | |
| 2012/0072431 A1 | 3/2012 | Berlener et al. | |
| 2012/0253865 A1 | 10/2012 | Narasimhamurt | |
| 2015/0039375 A1* | 2/2015 | Grichnik | G06Q 10/06313 |
| | | | 705/7.23 |
| 2015/0100365 A1 | 4/2015 | Torkian et al. | |
| 2015/0120373 A1 | 4/2015 | Bajaj et al. | |
| 2019/0073611 A1 | 3/2019 | Sahota | |
| 2019/0188621 A1 | 6/2019 | Nasu | |
| 2021/0049532 A1 | 2/2021 | Smith | |
| 2021/0091957 A1 | 3/2021 | Ford | |
| 2021/0158259 A1 | 5/2021 | Evans et al. | |
| 2021/0256443 A1 | 8/2021 | Srivastava et al. | |
| 2022/0156693 A1* | 5/2022 | Singh | G06Q 30/0205 |

OTHER PUBLICATIONS

Barbaro, R.W. et al. "Generalized Multiperiod MIP Model for Production Scheduling and Processing Facilities Selection and Location," "Technical Papers," Mining Engineering, SME preprint 83-123, SME-AIME Annual Meeting, Atlanta, GA, Mar. 1983. Manuscript Jan. 1983. Feb. 1986, pp. 107-114 (8 pgs), Feb. 1, 1986.

Maravelias, Christopher T., "Mixed Integer Programming Methods for Supply Chain Optimization," Chemical and Biological Engineering, University of Wisconsin, Madison, WI 53706, USA, for "PASI 2011," Jul. 19-29, 2011, Angra dos Reis, RJ, Brazil, 187 pages, Jul. 19-29, 2011.

Georgiadis, Georgios P. et al., "Optimization-Based Scheduling for the Process Industries: From Theory to Real-Life Industrial Applications," "Processes 2019," 7,438; doi: 10,3390/pr7070438, www.mdpi.com/journal/processes, Received: May 27, 2019, Accepted: Jul. 4, 2019; and Published Jul. 10, 2019, pp. 1-35, Jul. 10, 2019.

Eskandarpour, Majid, Pierre Dejax, and Olivier Péton. "A large neighborhood search heuristic for supply chain network." *Ecole des Mines de Nantes, Technical report AUTO*/14.3 (2014).

N. Viswanadham, R Gaonkar, and V. Subramanian, "Optimal configuration and partner selection in dynamic manufacturing networks," Proceedings 2001 ICRA. IEEE International Conference on Robotics and Automation (Cat. No. 01CH37164), Seoul, South Korea, 2001, pp. 854-859, vol. 1.

\* cited by examiner

Duty Rate (New table) — 310

| Product Name | Source | Site | Zone of Origin | Zone of Destination | Duty Rate | Product Value Override |
|---|---|---|---|---|---|---|
| FG | USA | Canada | North America | - | 0% | $ 19 |
| FG | USA | Canada | ASEAN | - | 11% | $ 29 |
| RM | Vietnam | Thailand | ASEAN | - | 8% | $ 19 |
| RM | Vietnam | Thailand | S. Korea | - | 15% | $ 21 |

Sites (Existing table) — 320

| Name | Tax Region | ... |
|---|---|---|
| CZ | North America | |
| DC | North America | |
| MFG 1 | North America | |
| MFG 2 | ASEAN | |
| Supplier | ASEAN | |
| ... | | |

Taxable Value Override (Existing table) — 330

| Tax Region | Product | Product Value Override | ... |
|---|---|---|---|
| North America | FG | $ 29 | |
| North America | ... | | |
| ASEAN | RM | $ 19 | |

*FIG. 3*

SYSTEMS AND METHODS FOR DETERMINING DUTY COSTS ASSOCIATED WITH A SUPPLY CHAIN NETWORK

TECHNICAL FIELD

One technical field of the present disclosure is computer-implemented spend management systems and e-procurement systems offered as software as a service (SaaS). Another technical field of the present disclosure is computer-implemented algorithms for supply chain management including determining tax and duty costs associated with supply chain networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Supply chain networks or other modeling techniques are often used to analyze and optimize shipping and production by predicting the best combinations of sites, for example distribution centers, suppliers, vendors, and manufacturers, to utilize to meet consumer demand for a particular finished good. Supply chain network techniques often employ multiple levels of interdependence and connectivity between sites within the supply chain network. multiple models or techniques to predict the behavior and interactions between these sites to optimally deliver goods and services to various points or locations along the supply chain network.

Duty costs, tariffs, dues, or other similar taxes levied on imported and exported finished goods and raw materials result in significant annual expenses for businesses that rely on these goods and materials for their sales. Different local, municipal, state, and federal governments may levy duty costs and other taxes based on several factors. Duty costs often depend on the origination and flow of the raw materials and manufacture of products. Duty rates for an individual product can be calculated based on factors such as point of origin (or "source"), the total purchase value of the product or raw material, and the point of consumption (or "destination"). Thus, a corporation may incur duty costs and taxes at several junctions along a typical supply chain, stemming from raw material procurement to finished good delivery.

SUMMARY

The appended claims may serve as a summary of the invention.

BRIEF DESCRIPTION OF THE DRAWINGS

In the drawings:

FIG. 3 illustrates representative input data associated with a supply chain network.

DETAILED DESCRIPTION

Figure 1A:
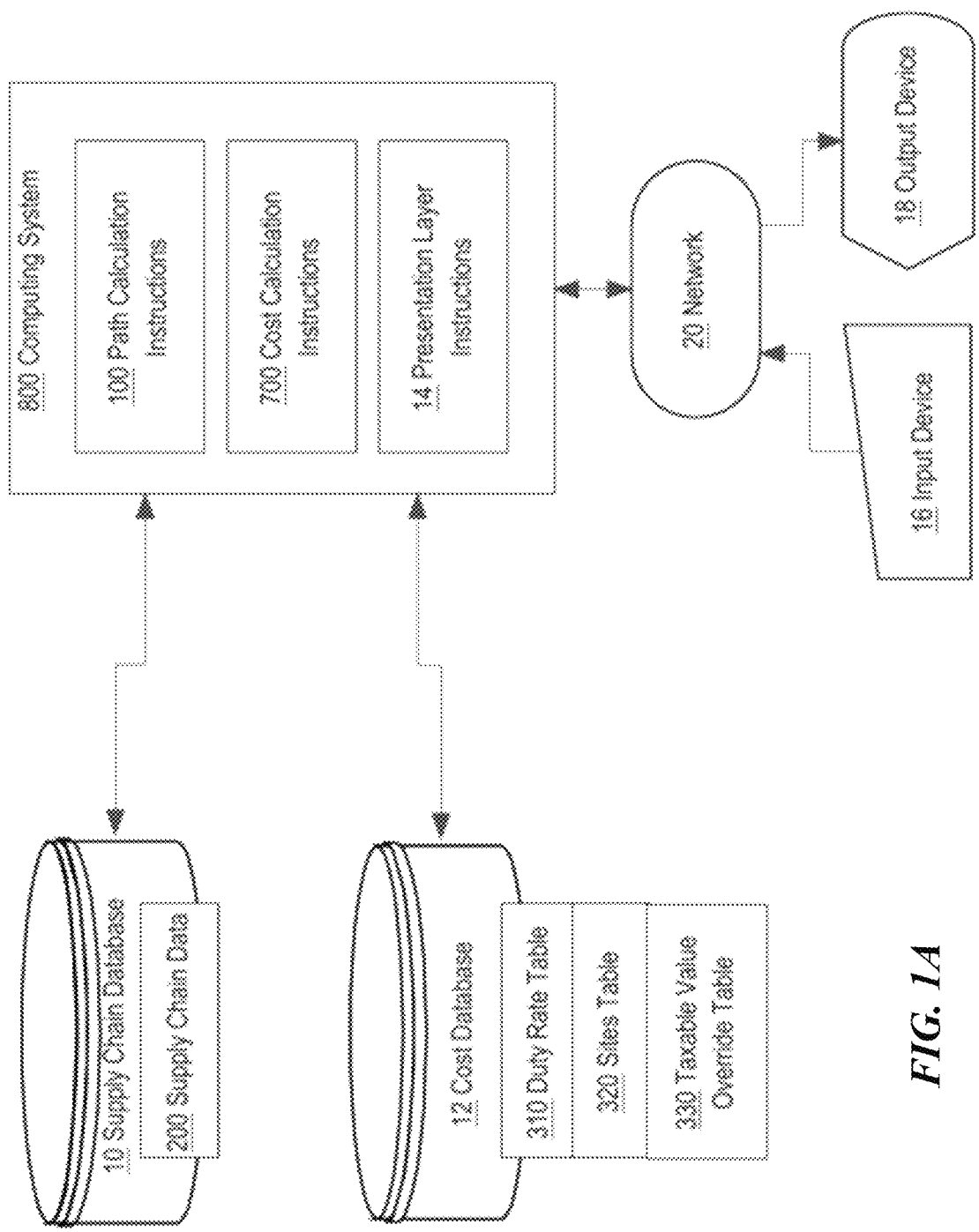
FIG. 1A illustrates an example distributed computer system with which an embodiment can be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. General Overview
2. Structural & Functional Overview
3. Implementation Example—Hardware Overview
4. Extension and Alternatives 1. General Overview Embodiments provide computer-implemented methods, and stored program computer systems, capable of calculating taxes, duties, and other costs of commodities moving in complex supply chains having multiple different possible paths and path fragments. Embodiments may be programmed to calculate a plurality of path solutions from starting points to ending points of complex supply chains and to dynamically calculate and/or update costs of transferring commodities from one point in a complex chain to another point in the complex chain. User input or programmatic input may specify an arbitrary starting point of a commodity in the complex supply chain and an arbitrary ending point and the methods and systems are programmed to automatically calculate end-to-end costs taking into account duties, taxes, and other costs imposed by points in the chain.

In one embodiment, a computer-implemented method, comprises receiving input data comprising an order to provide a quantity of one or more finished goods to a site through a supply chain network, the one or more finished goods each comprising one or more raw materials; accessing information that defines an architecture of the supply chain network comprising a plurality of sites, wherein the information comprises a location of each of the plurality of sites;

enumerating, based on the input data and the architecture, one or more path solutions along the supply chain network to fulfill the order, wherein each path solution comprises a plurality of path fragments connecting two sites of the plurality of sites, wherein a path fragment defines a movement of a sub-quantity of the one or more finished goods or the one or more raw materials between two sites; determining a cost associated with each of the plurality of path fragments, wherein the cost comprises a duty rate, wherein the duty rate associated with a particular path fragment is based on the locations of the two sites connected by the particular path fragment and the sub-quantity of the one or more finished goods or one or more finished goods raw materials moved between the two sites; determining one or more optimal path solutions based on the determined cost associated with the one or more path fragments comprising each enumerated path solutions; and outputting the one or more optimal path solutions for display on a client device.

2. Structural & Functional Overview

In the following description, the following terms have the following meanings.

As used herein, "finished good" or "FG" as used in accordance with the present disclosure refers to any product or its derivatives that has completed the manufacturing process and is ready to be sold, offered for sale, or otherwise distributed to the general public. A finished good may have a bill of materials ("BOM"), which describes the composition of a finished good. A finished good may be composed of one or more raw materials, one or more other finished goods, or any combination of the aforementioned. For example, a finished good may be a candle, which comprises wax (a raw material), a wick (a raw material), and a glass jar (a finished material, comprising sand (a raw material), soda ash (a raw material), and limestone (a raw material)).

As used herein, "raw material" or "RM" as used in accordance with the present disclosure refers to any unprocessed or unmanufactured material, or a minimally processed or minimally manufactured material used to create a finished good. One or more raw materials may be used to manufacture a finished good. For example, a raw material may include latex, water, sand, latex, soda ash, cotton, iron, silver, clay, or similar.

As used herein, "Customer Zone" or "CZ" as used in accordance with the present disclosure refers to the location of demand in the network path, it may be any port of entry, free trade zone, customs zone, or other destination at which customs duties are assessed or charged for goods or commodities, and/or any entity associated with such a destination, such as a customs broker. A CZ may receive one or more finished goods from one or more distribution centers. Further, a CZ can represent an individual location or a group of locations in proximity. For example, CZs may represent sites in a supply chain network for a particular state or postal code region. One or more CZs may represent sites in a supply chain network for a particular finished good, or a group of finished goods.

As used herein, "distribution center" or "DC" as used in accordance with the present disclosure refers to any location, business, or other entity where one or more finished goods are stocked, stored, and managed prior to shipping finished goods to the one or more CZs (e.g., a warehouse). A distribution center may receive one or more finished goods from one or more manufacturers. For example, a distribution center may receive a candle. One or more distribution centers may represent sites in a supply chain network for a particular finished good, or a group of finished goods.

As used herein, "manufacturer" or "MFG" as used in accordance with the present disclosure refers to any location, business, or other facility where one or more raw materials ("RM") and/or one or more finished goods are received and used to produce or manufacture one or more finished goods. A manufacturer may receive one or more raw materials or one or more finished goods from suppliers, vendors, or other manufacturers, For example, a manufacturer may receive wax (a raw material), a wick (a raw material), and a glass jar (a finished good) to manufacture and produce a candle. One or more manufacturers may represent sites in a supply chain network for a particular finished good, or a group of finished goods.

As used herein, "supplier" as used in accordance with the present disclosure refers to any location, business, or other entity that provides goods or services to a manufacturer. A supplier may receive one or more raw materials from one or more vendors, other suppliers, or from one or more manufacturers, and send them to one or more manufacturers or suppliers. One or more suppliers may represent sites in a supply chain network for a particular finished good, or a group of finished goods.

As used herein, "vendor" as used in accordance with the present disclosure refers to any location, business, or other entity that makes or procures raw materials for sale. One or more vendors may represent sites in a supply chain network for a particular finished good, or a group of finished goods.

Duty costs, tariffs, dues, or other similar taxes levied on imported finished goods and raw materials result in significant annual expenses for businesses that rely on these goods and materials for their sales. Duty costs depend on the origination and flow of the raw materials and manufacture of products. Duty rates for an individual product can be calculated based on factors such as point of origin (or "source"), the total purchase value of the product or raw material, and the point of consumption (or "destination"). More specifically, for finished goods the duty rate is determined by the location where the finished good is manufactured, whereas for raw materials the duty rate is a function of the origin region or country where the raw material is sourced, and the end region or country where the raw material is consumed (e.g., used as a component to manufacture a finished good). Thus, a corporation may incur duty costs and taxes at several junctions along a typical supply chain, stemming from raw material procurement to finished good delivery.

Corporations today often employ supply chain networks or other modeling techniques to analyze and optimize their supply chains by predicting the best combinations of suppliers and manufacturers to utilize to meet consumer demand. However, existing supply chain network techniques often employ multiple models that exclude certain financial considerations or fail to consider how different stages of the supply chain (e.g., supplier to manufacturer, manufacturer to distributor, etc.) interact with one another. This is a difficult process, especially for large supply chain networks, which grow exponentially with the number of sites and finished products involved. Moreover, inefficient decisions made at one junction along a supply chain may compound and create greater inefficiencies at other points along the chain. This may result in supply chain network outputs that are costly or even unfeasible.

Further, the complexities of these models often require substantial computing power and resources to operate. For example, corporations may have dozens of distribution centers, manufacturers, and raw materials suppliers that may be used to produce several finished goods, each finished good comprising several raw materials. The resulting supply chain may require thousands to millions of iterations to generate an optimal supply path fragment. To efficiently generate an optimal solution, advanced processing equipment, large storage capacity, memory, and power may be required to quickly process and produce an optimal path fragment along the supply chain. Additionally, consumers may require customizable and detailed constraints unique to the supply chain network (e.g., shipping costs, material costs, or other variable specific to a consumer) to provide a feasible and accurate solution that is tailored to the individual consumer. This customized detail enables optimization of complex components of the supply chain, for example a manufacturer that receives a vast array of raw materials and produces a plethora of different types of finished goods.

Embodiments disclosed herein provide solutions to minimize duty costs and taxes associated with production along a supply chain network. These techniques allow for solutions for finished product and raw materials flow and sourcing optimization problems associated with path-based duty and tax costs in a supply chain network. In an embodiment, a computing system is programmed to access input data that defines the architecture of a supply chain network, including information regarding finished goods, raw materials, and sites comprising a particular supply chain. The computing system is programmed to access input data received regarding an order for the fulfillment of a particular quantity of a finished product at a particular site (e.g., a CZ or distribution center). Using this data, the computing system is programmed to enumerate one or more path solutions along the supply chain network and generate one or more paths that indicate the sites where particular quantities of goods should be manufactured, as well as sites where particular quantities of raw materials should be purchased from in order to obtain an optimal result for the consumer. The optimal result may include for example, one or more paths along the supply chain network that minimize the duty costs and other taxes incurred while fulfilling the order. In some embodiments a heuristic method may be used to select high priority paths to handle the exponential growth of paths in a complex supply chain network. In this manner, a consumer can quickly and efficiently fulfill multiple orders with a supply chain networks while reducing costs and meeting the needs of their customers.

FIG. 1A illustrates an example distributed computer system with which an embodiment may be implemented. In the example of FIG. 1A, a computer system 800 is communicatively coupled to a supply chain database 10, cost database 12, and network 20. Computer system 800 may have the structure of FIG. 8, or may comprise one or more computers, servers, and/or virtual machine instances in any of public and private datacenters and/or cloud computing facilities. In one embodiment, computer system 800 is a virtual machine instance of a multi-tenant, SaaS-based spend management system, or interoperates with such a system.

Supply chain database 10 may comprise a relational database system, flat file system, object database, or other repository that is programmed to store structured data in one or more tables or other data structures. In one embodiment, supply chain database 10 stores supply chain data representing an SCN 200 as further described herein in relation to FIG. 2.

Cost database 12 may comprise a relational database system, flat file system, object database, or other repository that is programmed to store structured data in one or more tables or other data structures. In one embodiment, cost database 12 stores duty rate table 310, site table 320, and taxable value override table 330 as further described herein in relation to FIG. 3.

In one embodiment, computer system 800 is programmed to execute path calculation instructions 100, cost calculation instructions 700, and presentation layer instructions 14. For example, path calculation instructions 100 may be programmed to correspond to the algorithm or method of FIG. 1B, cost calculation instructions 700 may be programmed to correspond to the method of FIG. 7. Presentation layer instructions 14 are programmed to receive digital data input from one or more input devices 16 and to format output data for transmission to output device 18 for rendering at the output device. For example, presentation layer instructions 14 may be programmed to generate dynamic HTML for presentation as web pages at output device 18 as part of delivering execution of path calculation instructions 100 and cost calculation instructions 700 as SaaS.

Computer system 800 also may comprise non-volatile storage and/or volatile memory for use in storing working copies of the tables and other data structures that are further described herein in relation to FIG. 2, FIG. 3, FIG. 4A, FIG. 4B, FIG. 5, FIG. 6A, FIG. 6B. Thus, each of FIG. 2, FIG. 3, FIG. 4A, FIG. 4B, FIG. 5, FIG. 6A, FIG. 6B graphically illustrates electronic data that is digitally stored at least transiently during access, calculations, transformation, and output in one or more of volatile or non-volatile digital computer memory.

Input device 16, output device 18 may be associated with a user account that is maintained in computer system 800, or other elements of a SaaS spend management system, and accessed using dynamically generated web pages via network 20. The network 20 broadly represents one or more local area networks, wide area networks, internetworks, or a combination thereof using any of terrestrial or satellite, wired or wireless network links.

Figure 1B:
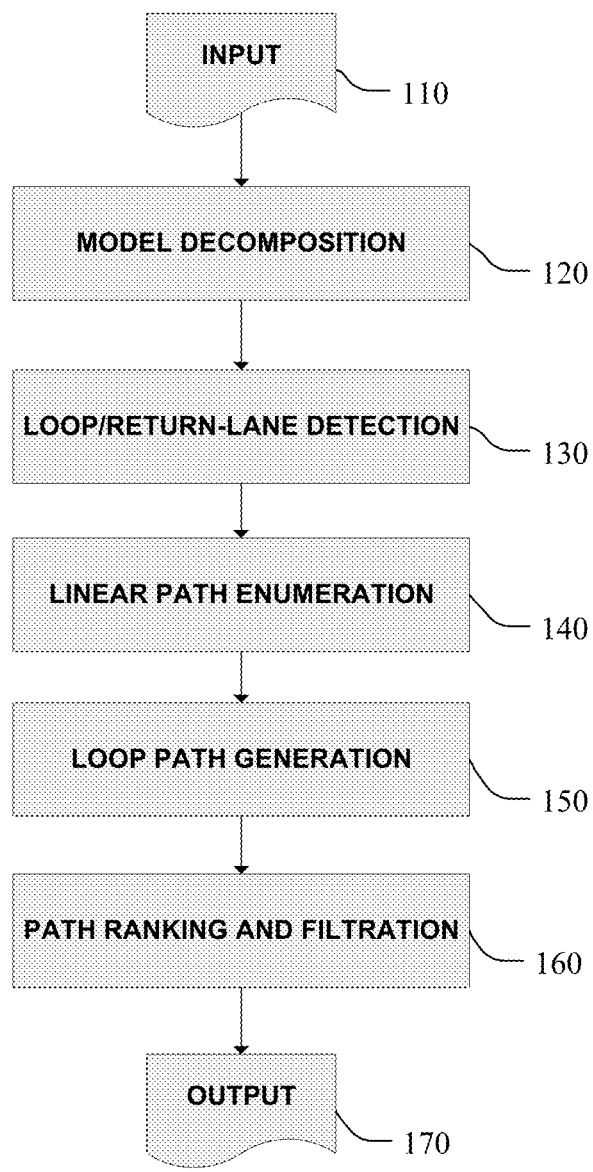
FIG. 1B illustrates an example computer-implemented method for generating an optimal path solution.

FIG. 1B illustrates an example computer-implemented method for generating an optimal path solution.

In the example of FIG. 1B, a method implementing the path calculation instructions 100 begins execution at step 110 at which a computing system may receive an input comprising an order for a fulfillment of one or more finished goods (including a BOM for each finished good) at one or more locations. The input may further comprise one or more conditions or information that defines the architecture of a supply chain network used to fulfill the order, along with a list of predetermined criteria to optimally complete the order (e.g., at the lowest cost, quickest speed, etc.).

Using this information, at step 120 the computing system is programmed to decompose the model of the supply chain network, using for example one or more commonalities of the finished goods in the order. At step 130, the computing system is programmed to detect and remove one or more loops in the supply chain network based on a circular movement of finished goods or raw materials between two or more sites in the network. At step 140, the computing system is programmed to enumerate one or more path solutions, comprising one or more path fragments along with associated sub-quantities of finished goods and/or raw materials in the supply chain network that can be utilized to fulfill the order.

At step 150, the computing system is programmed to generate one or more loop paths based on the detected loops. At step 160, the computing system is programmed to rank and filter the paths based on the criteria provided. Using these rankings, the computing system is programmed to generate an output 170 comprising one or more optimal path solutions that describe an optimal way to fulfill the order using the supply chain network.

Particular embodiments may repeat one or more steps of the method of FIG. 1B, where appropriate. Although this disclosure describes and illustrates particular steps of the method of FIG. 1B as occurring in a particular order, this disclosure contemplates any suitable steps of the method of FIG. 1B occurring in any suitable order. Moreover, although this disclosure describes and illustrates an example method for generating an optimal path solution including the particular steps of the method of FIG. 1B, this disclosure contemplates any suitable method for generating an optimal path solution including any suitable steps, which may include all, some, or none of the steps of the method of FIG. 1B, where appropriate. Furthermore, although this disclosure describes and illustrates particular components, devices, or systems carrying out particular steps of the method of FIG. 1B, this disclosure contemplates any suitable combination of any suitable components, devices, or systems carrying out any suitable steps of the method of FIG. 1B.

Figure 2:
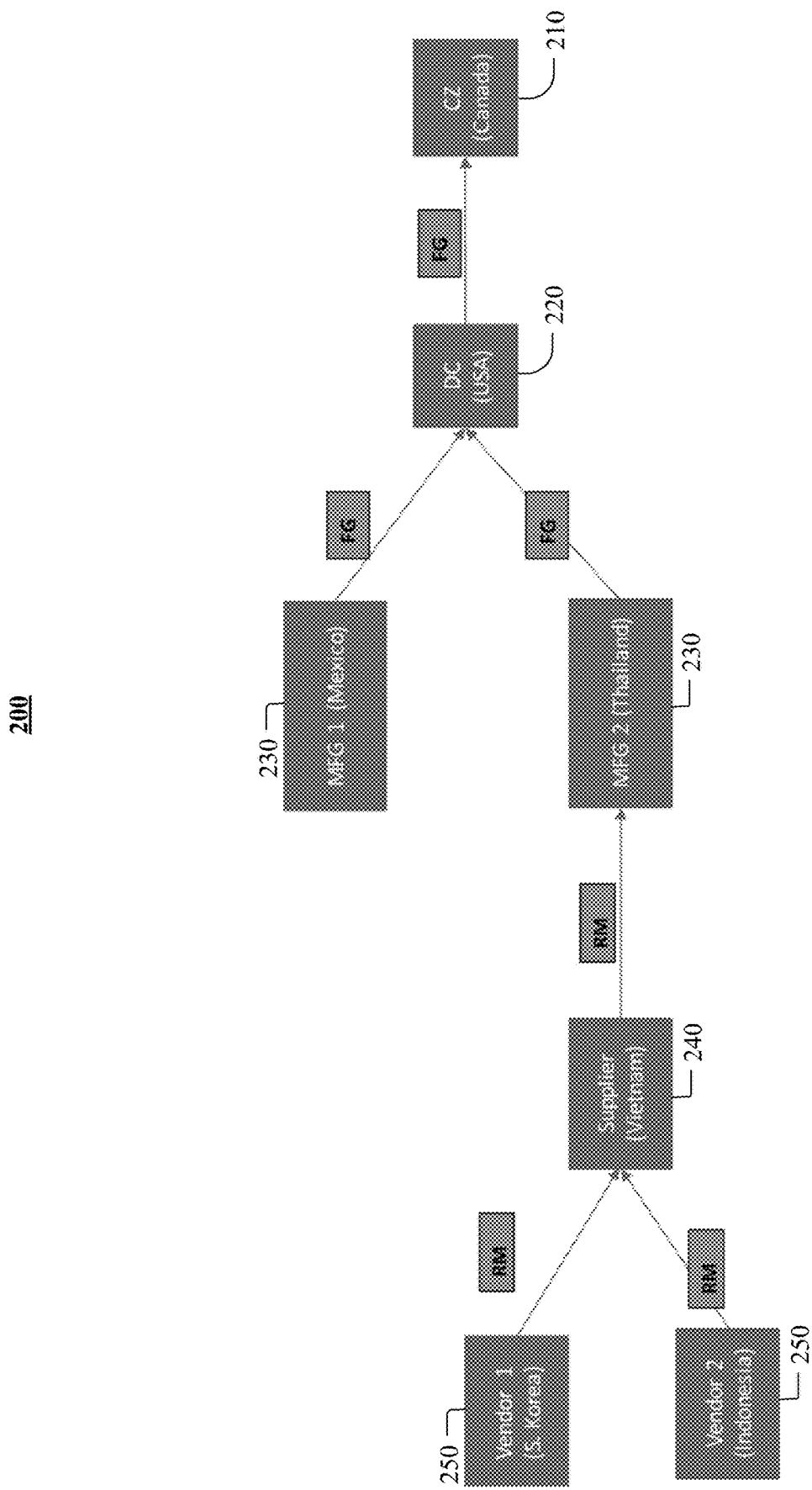
FIG. 2 illustrates an example supply chain network.

FIG. 2 illustrates an example supply chain network. Supply chain network ("SCN") 200 may comprise one or more sites that contribute to the production and distribution of a finished good. In particular embodiments a consumer of the optimization model (e.g., the) may be affiliated or associated with one or more sites of the SCN (e.g., owning, leasing, contracting, or otherwise having a business relationship with each site). Different sites in the supply chain may be connected by one or more path fragments, which connect and represent the movement of raw materials, finished goods, or similar commodities, between two or more sites in the SCN. As an example, and not by way of limitation, a path fragment may represent a particular site shipping (via air, boat, train, or any other reasonable means) one or more raw materials or finished goods to another site in the SCN.

SCN 200 may comprise several sites. As illustrated in FIG. 2, SCN 200 may comprise "Customer Zone" ("CZ") 210, which may be one or more locations where finished goods ("FG") are sold. CZ 210 may receive one or more finished goods from one or more distribution centers ("DC") 220. A DC 220 may be a location, business, or other entity where one or more finished goods are stocked, stored, and managed prior to shipping finished goods to the one or more CZs (e.g., a warehouse). DC 220 may receive one or more finished goods from one or more manufacturing facilities ("MFG") 230. MFG 230 may be a location, business, or other entity where one or more raw materials ("RM") are received and used to produce or manufacture one or more finished goods. One or more MFGs 230 may receive raw materials from one or more suppliers 240. Supplier 240 may be a location, business, or other entity that provides goods or services to MFG 230.

One or more suppliers 240 may receive one or more raw materials from one or more vendors 250. A Vendor 250 may be a location, business, or other entity that makes or procures raw materials for sale. Each component of the supply chain may be associated with a location, for example and not by way of limitation a country (e.g., Thailand), or a region (e.g., Southeast Asia). Although FIG. 2 depicts a SCN 200 with all the components described herein, it should be appreciated that a SCN can comprise any combination of the components described herein and in FIG. 2, for example and not by way of limitation, multiple MFGs 230, suppliers 240, and vendors 250.

FIG. 3 illustrates representative input data associated with a supply chain network. In particular embodiments the optimization model may generate a duty rate table 310 for a particular SCN based on one or more inputs that are unique and customized to produce a more accurate optimization result. For example, in particular embodiments the input information may be unique to individual sites comprising the SCN to generate site table 320, which may include the type of site (e.g., CZ, DZ, MFG, etc.) and tax region (e.g., a country or region where the site is located). Although not depicted in FIG. 3, site table 320 may further comprise other relevant information relevant to generating an optimal and feasible output to fulfill an order for a finished good using a particular SCN, including for example and not by way of limitation the types of finished products (including their bill of materials), raw materials sent or received from the site, available transportation types (etc. air, sea, etc.) and average shipping times of finished products or raw materials from the particular site, information about costs and times to produce or manufacture finished goods or raw materials at a particular site, or other defined filters or criteria that describe specific conditions or costs associated with a particular site. Alternatively, in some embodiments the taxable value may be overridden to generate taxable value override table 330. This override value may account for specific conditions or rates incurred at a particular site, for example additional fees or taxes the consumer may be subject to at a particular site. Although not depicted in FIG. 3, input data may further comprise one or more conditions, limitations, descriptions, or data to describe the architecture of a supply chain network used to fulfill the order, data comprising the composition of one or more finished goods (e.g., a BOM), along with a list of one or more predetermined criteria to optimally complete the order (e.g., at the lowest cost, quickest speed, etc.).

In particular embodiments the computing system may use the input data to seek an optimal path solution for a particular supply chain network to fulfill and order for a particular quantity of one or more particular finished goods. An optimal path solution may comprise a set of paths along a supply chain network comprising a set of path fragments defining a movement of finished goods or raw materials between two sites in the supply chain network. In a particular optimal path solution, each path fragment may define a movement of a sub-quantity of the finished good or the one or more raw materials between two sites. To generate an optimal path solution for a particular set of input data, the computing system may receive an input data comprising a quantity of one or more finished goods, along with one or more other constraints, for example, temporary price increases, shipping delays, or other external factors that are specific to particular sites (e.g., a natural disaster has temporarily limited the ability of a particular supplier in the supply chain to meet the demand of raw materials needed for this particular finished good).

In particular embodiments the computing system may decompose the SCN into one or more sub-networks in order to better provide an optimal solution for a particular input. Decomposing the original SCN into one or more sub-networks prior to enumerating paths may greatly reduce the memory usage by the computing system during operation, decrease the runtime required to produce one or more optimal solution paths, and also make it possible to enumerate any path solutions through parallel computing.

Figure 4A:
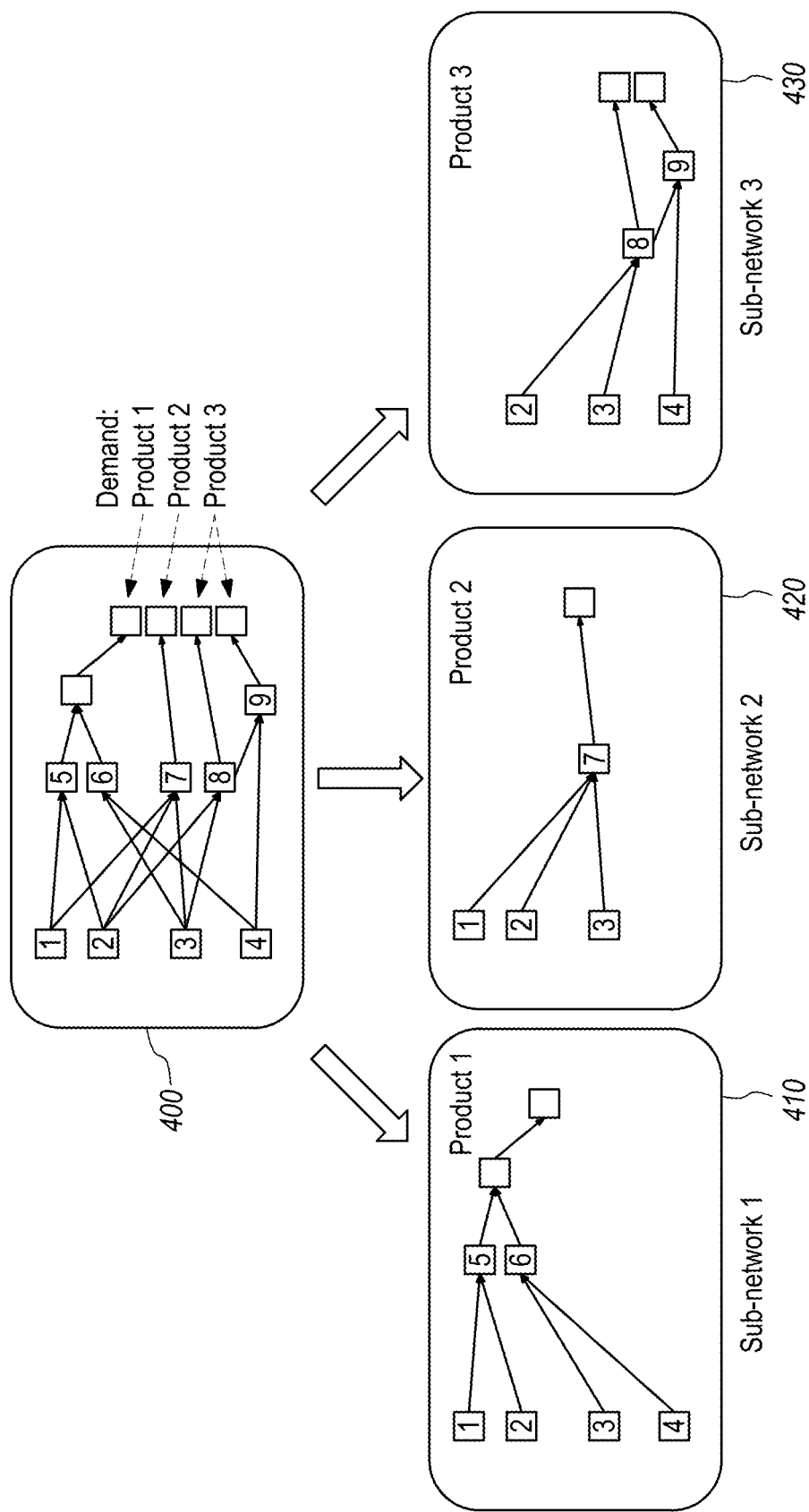
FIG. 4A illustrates a decomposition of a supply chain network into one or more sub-networks.

FIG. 4A illustrates a decomposition of a supply chain network into one or more sub-networks. As illustrated in FIG. 4A, the computing system may receive an input describing a particular SCN 400 that may be used to fulfill an order for four finished goods at four different sites. To decompose SCN 400 for this particular input, the computing system may first segregate the SCN 400 using a bill of materials relational analysis (BOM) for each finished good, which defines the composition of each finished good. For example, if finished good X and finished good Y share a common raw material Z in the BOM, finished good X and finished good Y may be considered to share a BOM connection. In particular embodiments the computing system may be programmed to extract and cluster finished goods into sub-networks based on their BOM connections. As illustrated in FIG. 4A, no finished goods share a BOM connection, so the computing system may build a separate sub-network 410-430 for each finished good.

Figure 4B:
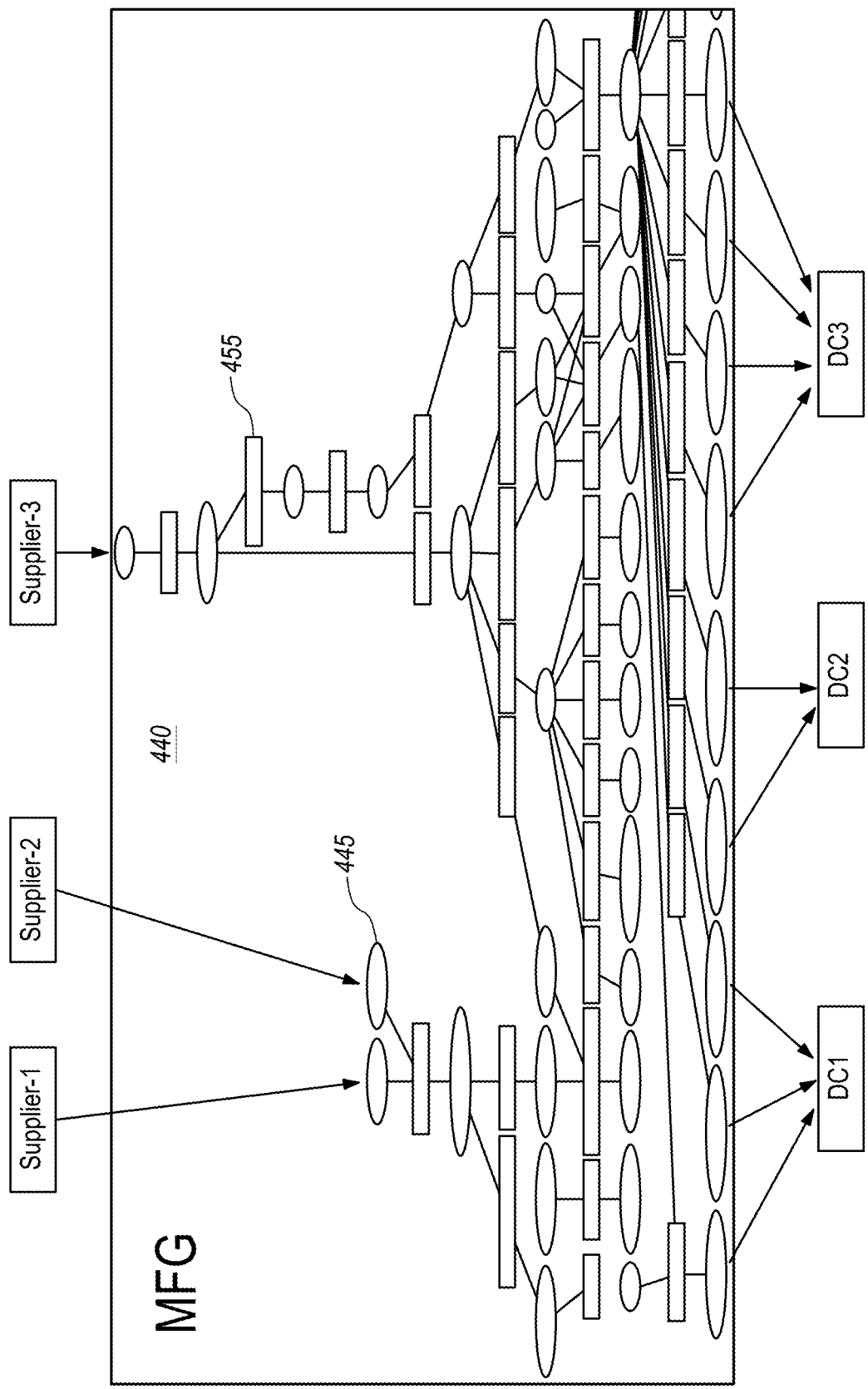
FIG. 4B illustrates an example finished good network for a manufacturing site in a sub-network.

In particular embodiments, the computing system may analyze each sub-network and further generate a finished good network for each site in the sub-network. FIG. 4B illustrates an example finished good network for a manufacturing site in a sub-network. For a given MFG 440, each oval 445 may represent a finished good MFG 440 is capable of producing or a raw material, and each rectangle may represent a BOM 455 that describes the composition of each finished good manufactured by MFG 440. As depicted in FIG. 4B, a given MFG (e.g., MFG 440) may receive multiple types of raw materials and manufacture multiple different types of finished goods, and in particular embodiments a manufacturing site may further combine one or more finished goods or raw materials to produce a different finished good. For example, a given manufacturer could receive glass (a finished good) from another manufacturer in the SCN to manufacture display panels, which may then be used by the same manufacturer to manufacture smartphones, televisions, tablets, etc. In particular embodiments one or more sites in the SCN or sub-network may have a constructed finished good network for the site. Using a finished good network for a particular site, the computing system may further decompose the particular site into multiple sub-site networks, which may represent the manufacture of a single finished good within a site. These sub-networks, and sub-site networks can then the connected into the original supply chain network or sub-network to enable more efficient path enumeration.

A further problem often faced when modeling and optimizing supply chain networks are the presence of one or more loops in the SCN. A loop may be defined by one or more elements exchanging goods back and forth with one another. For example, returning to 2, a loop may occur if supplier 240 sends a raw material to a MFG 230, who in turn uses the raw material to manufacture an "intermediate product" that is then returned along a return path fragment to the same supplier 240. In turn, the supplier may combine the "intermediate product" with one or more additional raw materials that are in turn sent back to MFG 230. Loops create additional path fragments in the supply chain that must be accurately detected and evaluated.

Figure 5:
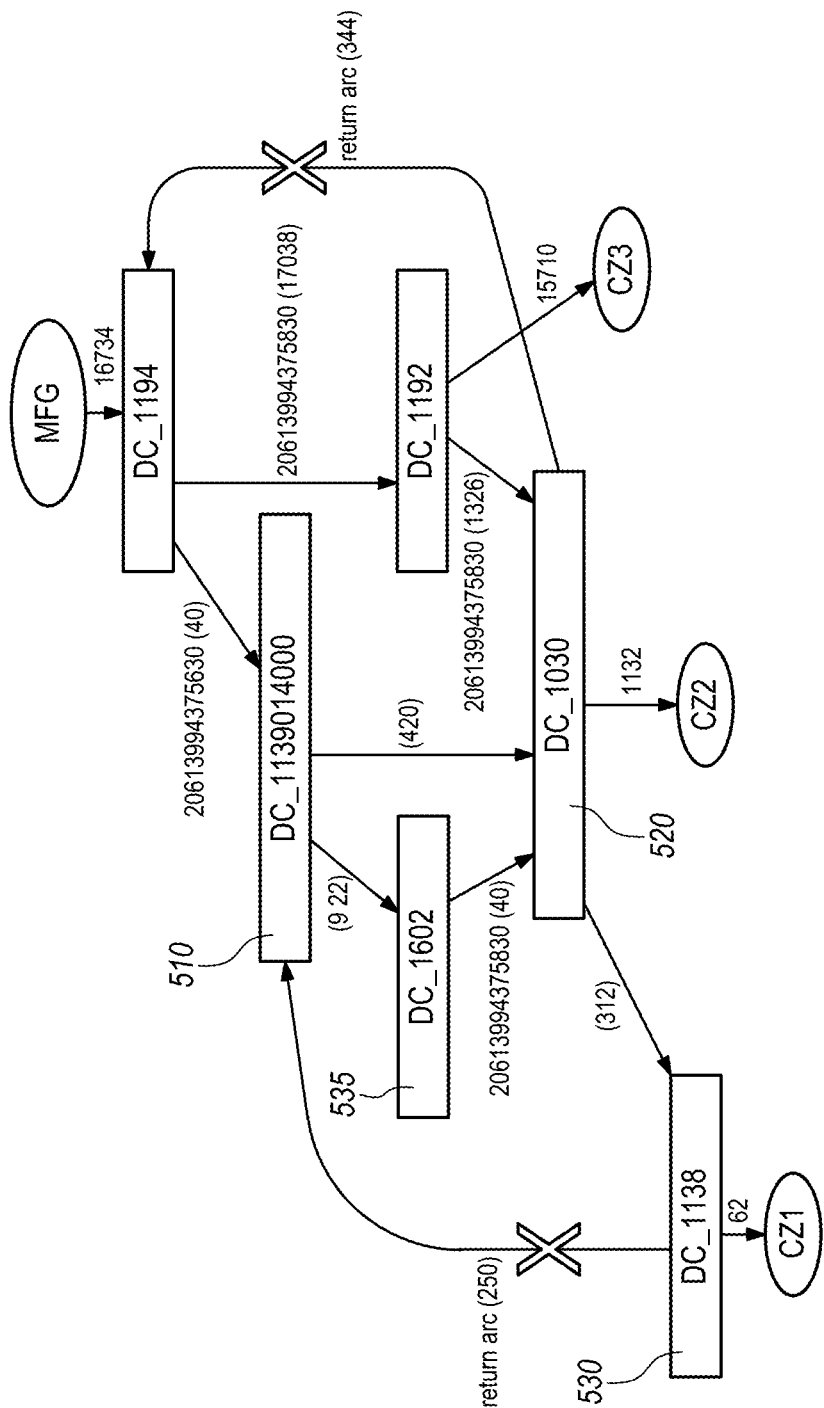
FIG. 5 illustrates a portion of a supply chain network that includes one or more loops.

In particular embodiments the computing system may further detect and extract one or more loops present in the supply chain network based on a given input. FIG. 5 illustrates a portion of a supply chain network that includes one or more loops. A loop may comprise two or more path fragments that connect two sites in a circular manner, such that a first site is sending a raw material and/or a finished good to a second site, which then sends a raw material and/or a finished good back to the first site (e.g. detecting when the destination site of a finished good or raw material is a known source site). For example, as illustrated in FIG. 5, DC 510 may send one or more finished goods that travel to DC 520, which may send one or more finished goods (of the same or a different type) to DC 530, which then sends one or more finished goods (of the same or a different type) back to DC 510. Without detecting and removing one or more loops, the output for one or more enumerated path solutions may be incorrect or may cause deadlock or errors in the processing of the model.

To detect one or more loops in an SCN, the computing system may take a top-down approach, starting with the source sites at the beginning of the SCN (e.g., suppliers, vendors, etc.) and proceeding forward. The computing system will proceed forward and search downstream sites for any return path fragments that may comprise a loop. Upon determining a path fragment leads to an upstream site that has already been visited (e.g., DC 510), the computing system may mark the path fragment as a "return path fragment" and determine a loop is present for a particular site.

To unlock or remove loops from the SCN, the computing system may assign an influence value to one or more downstream sites based on detecting a loop existing for a particular site. For example, in FIG. 5 the computing system may detect a loop associated with DC 510 and assign influence values to all downstream sites (e.g., DC 535 and DC 520). In particular embodiments influence values may be determined based on one or more factors, for example, the number of deadlock sites will be unlocked by selecting a particular downstream site (more unlocks may indicate a higher value), the number of the path fragments that can be visited next (e.g., the number of path fragments extending from each downstream site), the total transportation or shipping time of the path fragments that can be visited next, and the total cost of the associated with the path fragments that can be visited next. In particular embodiments the site with the highest influence value may be selected as the next downstream site, and the remaining path fragments associated with non-selected sites may be marked as "return path fragments." The computing system can then unlock the loop by generating a path from the upstream site to the downstream site with the highest influence value. In particular embodiments the computing system can repeat one or more of these steps until there are no further return path fragments detected in the SCN, such that the computing system is left with a number of linear paths in the SCN that can be used to fulfill the order for one or more finished goods as determined by the input data.

Figure 6A:
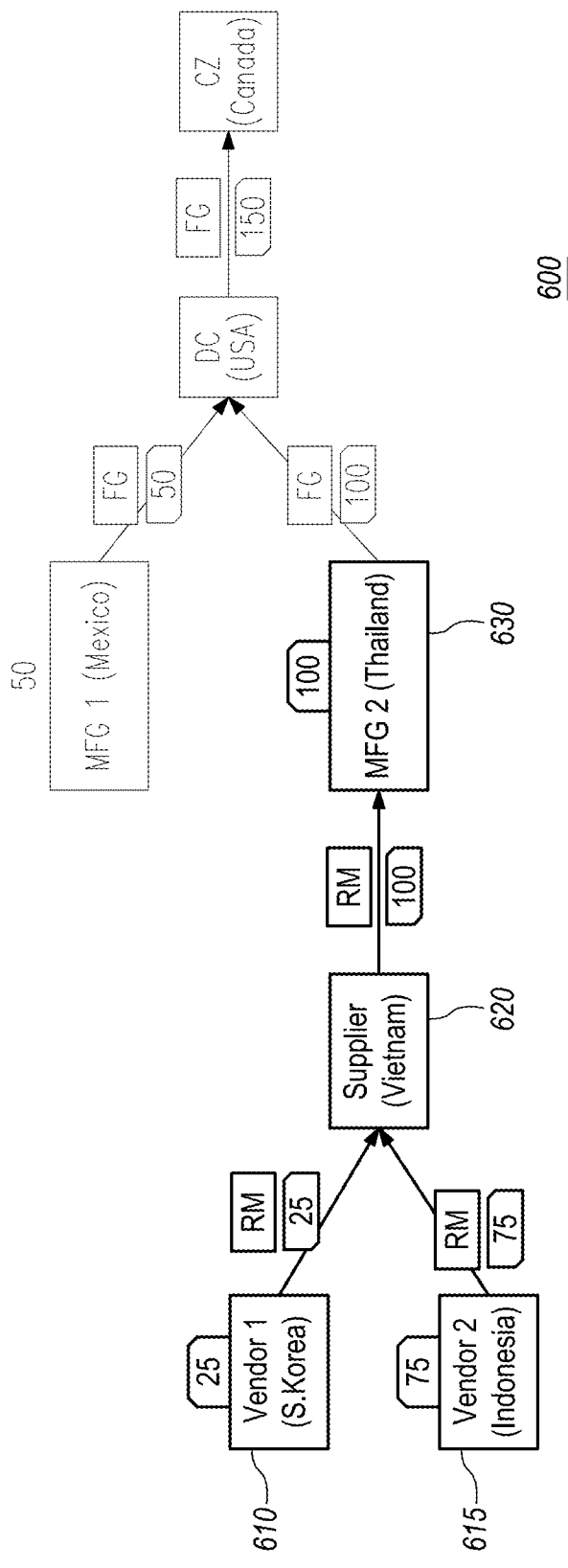
FIG. 6A and FIG. 6B illustrate an example enumerated path solution of a supply chain network used to fulfill an order for a particular finished good.
Figure 6B:
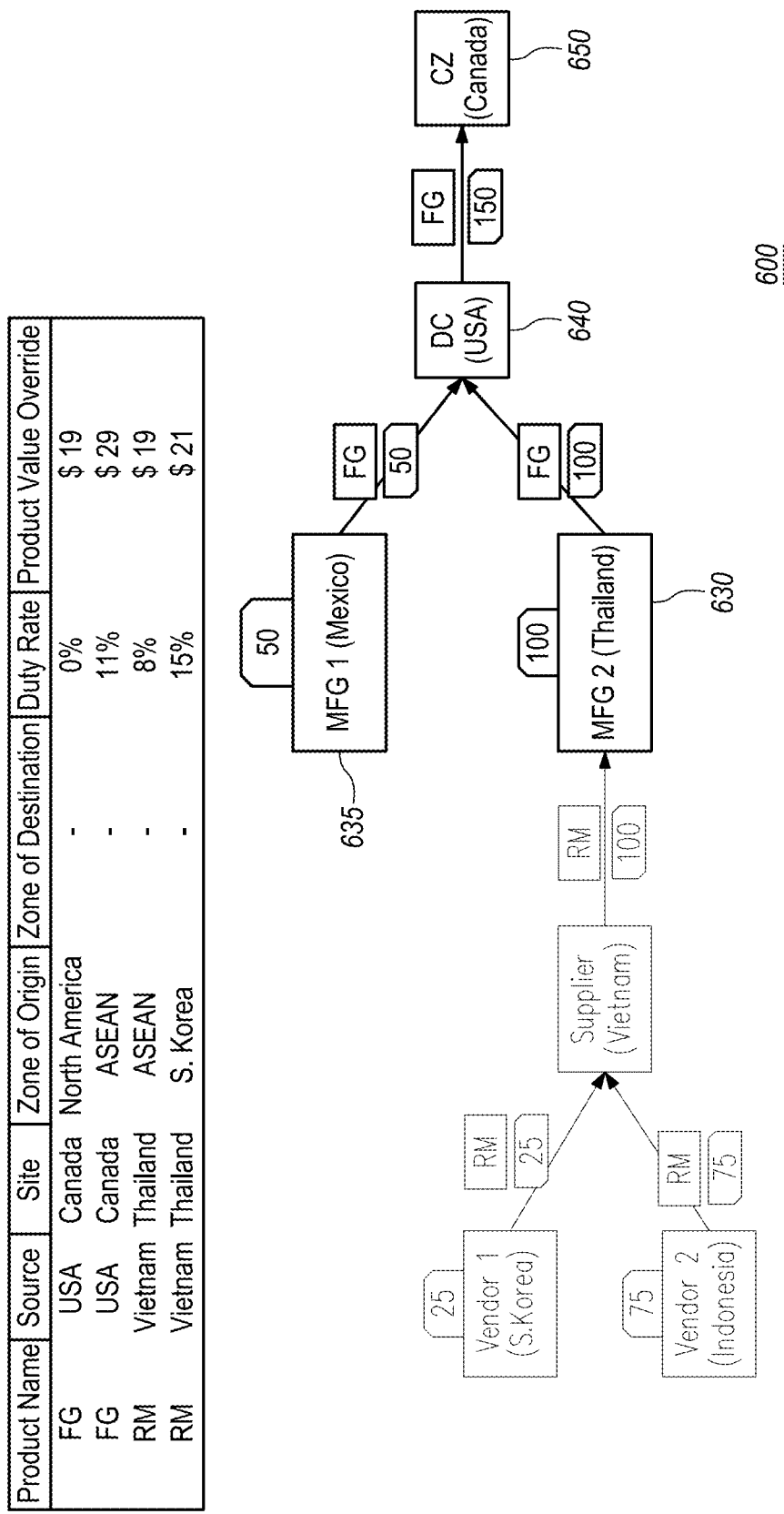

In particular embodiments the computing system may enumerate one or more path solutions for a particular set of input data that fulfill the order for a finished good. A path solution may comprise both a path, comprising one or more path fragments, and an associated sub-quantity of raw materials or finished goods for each path fragment comprising the path. FIG. 6A and FIG. 6B illustrate an example enumerated path solution of a supply chain network used to fulfill an order for a particular finished good.

As illustrated, an input may be received by the computing system for a quantity of 150 of finished goods X at a particular CZ 650 in Canada. From the bill of materials information for the finished good, the computing system may determine that each finished good requires a 1:1 ratio of a particular raw material. Based on the input data and architecture of the SCN, the computing system may enumerate one or more possible path solutions along SCN 600 to fulfill the order for 150 of finished good X by determining an appropriate combination of path fragments and associated sub-quantities of raw materials or finished goods at each path fragment to satisfy the input data.

In particular embodiments, the computing system is programmed to use a network optimization model to determine a one or more path solutions, comprising a combination of path fragments and associated sub-quantities of raw materials or finished goods at each path fragment an optimal path solution. In particular embodiments the network optimization model may comprise one or more linear equation models. For example, in FIG. 6A and FIG. 6B the computing system is programmed to use the network optimization model to output a path solution that includes path fragments that comprise a sub-quantity (a quantity less than or equal to the quantity of finished goods in the order) of "50" of the finished good should be manufactured at MFG 635 in and a sub-quantity of "100" of the FG should be manufactured at MFG 630, before being transported to DC 640 and CZ 650. MFG 635 (as illustrated in FIG. 6B) can provide a quantity of finished good X without the need for a supplier and/or vendor in the SCN 600 (e.g., the manufacturer already possesses the raw materials necessary to manufacture finished good X, already has an inventory of finished good X, or the manufacturer has independent suppliers and/or vendors that are outside of SCN 600).

The computing system may repeat this process along each level of the SCN 600, determining that there is one possible path fragment to transport raw materials between supplier 620 and MFG 630. For example, as illustrated in FIG. 6A, the computing system may identify all possible start sites, for example vendors 610, 615, that can provide one or more raw materials to MFG 635 required to manufacture finished good X. The computing system may generate path fragments that connect two vendors to one or more suppliers, for example a path fragment from vendor 610 to supplier 620, and from vendor 615 to supplier 620. To obtain the raw materials necessary to manufacture the sub-quantity of "100" finished goods at MFG 630, the network optimization model may further determine that vendor 615 should provide a sub-quantity of "75" raw materials and vendor 610 should provide a sub-quantity of "25" raw materials to supplier 620, with supplier 620 sending the sub-quantity of "100" raw materials to MFG 630.

In particular embodiments the computing system may be programmed to determine the duty cost per product unit associated with each path fragment in a particular path solution, which may comprise a duty rate of each path fragment. The duty rate of each path fragment on an SCN may be calculated as a function of, for example, the location or geographic region of the source site (e.g., the sending site), the location or geographic region of the receiving site, and the type of raw material or finished product transported along that path fragment. In particular embodiments the computing system may automatically determine the duty rate for a particular path fragment based on the particular inputs in site table 320 and taxable value override table 330, by accessing a database of known duty and tax rates as enacted by local, state, and federal governments based on the particular inputs of site table 320 and taxable value override table 330. In some embodiments the duty rate may be overridden or the computing system may be programmed to receive manual or programmatic input into duty rate table 310 to account for specific rates or conditions that may apply to the particular SCN.

In particular embodiments, the computing system may be programmed to utilize a network optimization model to determine one or more path solutions that minimize one or more variables or criteria to optimally fulfill an order for a particular quantity of finished goods using the SCN. The network optimization model is a maximization model programmed according to an algorithm in which the product flows (denoted flow) between two directly related sites in the supply chain network are decision variables. The model is programmed to represent the operations of the supply chain network. The flow variables are selected to satisfy the business requirements and thus act as constraints on the model. The total landing cost and revenue of the supply chain network are calculated using these flow variables.

In an embodiment, the network optimization model executes using a maximization function; the general use of maximization functions in other domains and for other purposes is a well-understood aspect of statistical programming and therefore this disclosure need no detail the structure or use of maximization functions as they are known to those of skill in the relevant arts. In an embodiment, an objective of the network optimization model is to determine values of the flow variables so that the profit of the network is maximized. For example, a consumer may wish to fulfill a particular order while incurring the lowest tax and duty costs. To account for tax and duty costs, the computing system may be programmed to generate a duty cost per unit equation for a path, where duty cost represents a duty cost associated with one or more path fragments comprising a particular enumerated path to fulfill an order for a quantity of finished goods. In particular embodiments the total duty cost for all paths is defined by the equation:

$$\text{total duty cost} = \Sigma_{p \in P} \Sigma_{path \in PATHS(p)} \text{pathflow}(path, p) * \text{duty cost per unit}(path, p)$$

where PATHS(p) represents a set of all paths enumerated for a finished good p in P, where P is a set of products, and pathflow is a decision variable of the product p for each path from the supplier to the final consumers in PATHS(p). In particular embodiments the total duty cost is an objective function added to an existing network optimization model. In particular embodiments total duty cost may be added to the network optimization model to determining a cost associated with each of the plurality of path fragments comprising a path. As discussed herein, the total duty cost may be based on the locations of the two sites (e.g., the source site and the destination site) connected by the particular path fragment and the particular quantity or sub-quantity of finished goods or raw materials moved between the two sites.

In particular embodiments, an additional constraint, relate_path fragment_and_flow may be added to the network optimization model to enforce that the total quantity of pathflow variables must be equal to the total quantity of flow variables calledflow(s,d,p), where s is a source site, d is a destination site, and p is a finished good. Relate_path fragment_and_flow is a constraint to enforce that the total quantity of path fragment flow variables must be equal to the total quantity of flow variables called flow (s,d,p), for each source (s), destination(d) and product(p) combination, defined by the equation:

$$\text{relate\_path fragment\_and\_flow} = \Sigma_{T, \Omega} \text{pathflow} = \Sigma_T \text{flow}(s,d,p)$$

where $\Omega$ is a set of all path fragments in PATHS(p) that contain the flow between s and d, and T is the set of all time periods in the model. In particular embodiments the relate_path fragment_and_flow constraint may be updated to reflect the initial and the ending inventory of a particular source site or destination site.

It should be appreciated that while FIG. 6A and FIG. 6B illustrate one possible path solution with associated sub-quantities of finished goods and raw materials necessary to fulfill an order for a quantity of 150 of finished good X at a particular location, the network optimization model may output any number of paths solutions and any number of sub-quantities of finished goods and raw materials necessary to fulfill the order. As an example, the network optimization model may output a second possible path solution that comprises the exact same sites and path fragments as illustrated in FIG. 6A and FIG. 6B, but in the second path solution the sub-quantity of finished goods from MFG 635 may be 1, and the sub-quantity of finished goods from MFG 630 may be 149. As a result, the network optimization model may output a sub-quantity of 100 raw materials from vender 610, and a sub-quantity of 49 raw materials from vendor 615.

It should be further appreciated that while FIG. 6A and FIG. 6B represent a simple SCN, in some embodiments an SCN may comprise hundreds or even thousands of sites, which may result in millions of path fragments and path solutions throughout the SCN to fulfill an order or demand for a particular finished good. As a result, for input data comprising orders to fulfill large quantities of finished goods (or multiple types of finished goods) in complex supply chain networks, thousands or even millions of possible path solutions exist to fulfill a particular order. As a result, in particular embodiments the computing system may use a heuristic approach and only generate a finite number of path solutions necessary to find one or more optimal path solutions based on the predetermined criteria. In particular embodiments, the computing system may dynamically release the memory of used or invalid path fragments during or after enumerating all possible paths along the SCN. For example, if a particular site is not capable of providing a particular raw material or manufacturing finished good, one or more path fragments stemming from the site may be removed to reduce the number of possible paths in the SCN to fulfill the order.

In particular embodiments, the computing system may further filter and eliminate particular enumerated path solutions or path fragments in the SCN for a particular order based on one or more site constraints or predetermined criteria, for example maximum or minimum materials or manufacturing costs, shipping times, current conditions (e.g., natural disasters that restrict operation, embargos, etc.) for the site. For example, as illustrated in FIG. 6A and FIG. 6B, if a particular quantity of finished good X must be received at CZ 650 within 28 days, and the input data reflects the quickest raw materials may be shipped from vendor 615 (in Indonesia) to supplier 620 (in Vietnam) is 30 days, the computing system may remove all possible As another example, if a particular distribution center is located in a country where there is a restriction or embargo on goods from a particular country or region (e.g., the United States has temporarily restricted or limited the quantity of products that can be imported from Mexico), the computing system may remove paths or path fragments that comprise sending finished goods from MFG 635 to DC 640.

Additionally, the computing system may rank one or more paths, which may comprise one or more full path fragments. For example, if the consumer desires one or more optimal path solutions that minimizes the cost associated with the one or more path fragments comprising each enumerated path, the computing system may rank the paths based on the cost associated with each path. As another example, the consumer may desire the fastest fulfillment of the order regardless of cost. In contrast, as another example the consumer may desire the cheapest fulfillment of the order, regardless of time. The input data may comprise any number of defined criteria in order to prioritize the possible paths of the SCN, for example and not by way of limitation, based on the total cost, the duty cost, the raw materials cost, the manufacturing cost, transportation costs, the time to fulfillment, the number of sites required, the location of sites required, or any other criteria that may be relevant to the decision of selecting a particular optimal path solution to fulfill an order for a quantity of finished goods. In particular embodiments the computing system may rank one or more optimal path solutions based on one or more criteria defined and the one or more path solutions of the network optimization model (e.g., from fastest fulfillment time to slowest, from cheapest fulfillment costs to most expensive, etc.).

In particular embodiments the computing system may output one or more optimal path solutions that indicate the quantity of finished goods and raw materials that should be routed through each site in the SCN. The output may be suitable for display to a consumer of the model (e.g., a corporation that operates the SCN) on a client device (e.g., a mobile device, tablet, smartwatch, etc.). In some embodiments the one or more paths outputted to the user may be based on the defined criteria. In some embodiments output may comprise a single top path, comprising the optimal movement of raw materials and finished goods along the SCN to fulfill the order based on the defined criteria. In some embodiments the output may comprise multiple paths, comprising multiple options for a path along the SCN that obtains an optimal or near-optimal fulfillment of the order based on the defined criteria. In other embodiments, the output may merely comprise one or more path fragments on the SCN, indicating a particular site or sites that should utilize to fulfill the order, but leaving the remaining decisions up to the consumer of the model. In particular embodiments it may not be necessary to output every path or path fragment. In this situation, rather than find an optimal solution, the computing system may be programmed to take a heuristic approach, outputting enough paths to provide a near-optimal or serviceable solution. In particular embodiments the output may comprise summary information for each path or path fragment. This information may include details regarding quantity of finished goods/raw materials, method of shipment, specific taxes and duty costs incurred, and any other information relevant to the consumer's determination of which path to use to fulfill the order. In particular embodiments the consumer may filter the one or more output paths or path fragments based on the consumer's needs.

Figure 7:
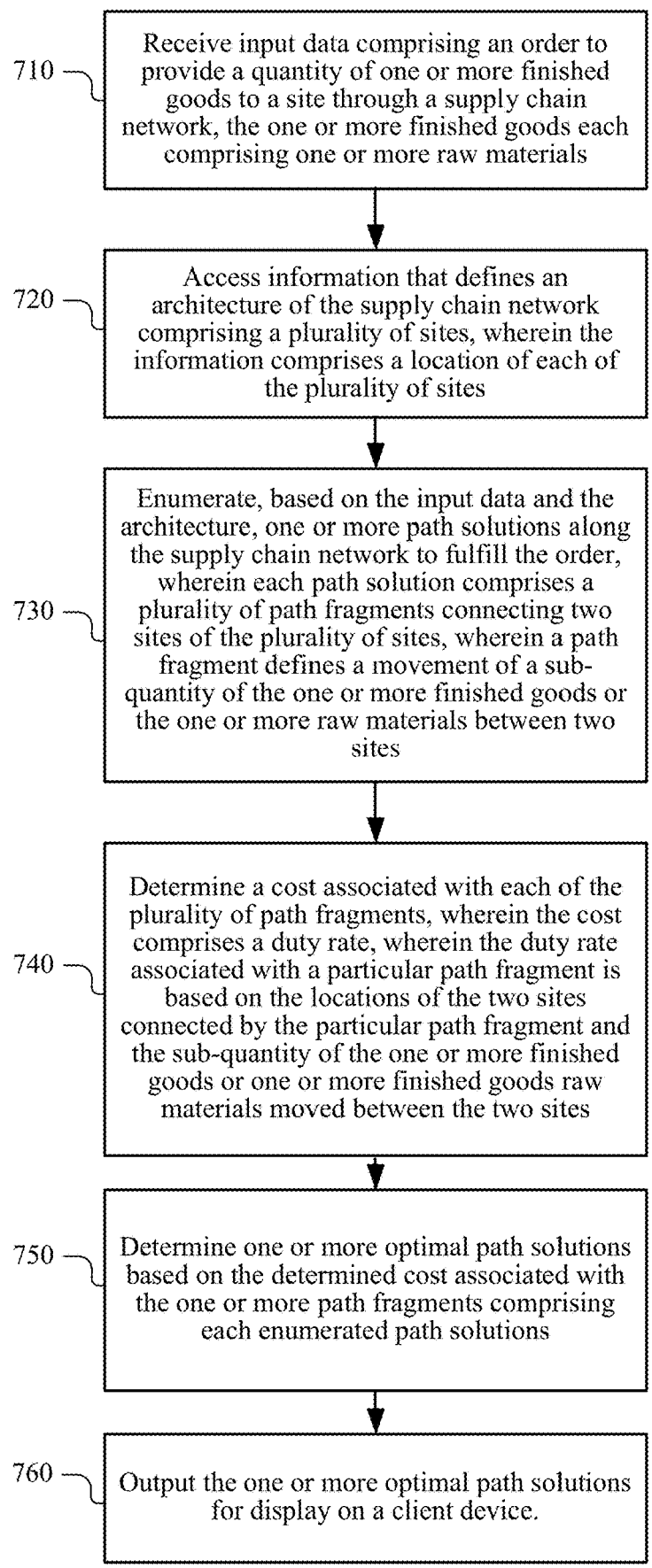
FIG. 7 illustrates an example computer-implemented method for determining one or more optimal path solutions based on the determined cost associated with the one or more path fragments.

FIG. 7 illustrates an example method to determine one or more optimal path solutions based on the determined cost associated with the one or more path fragments. In the example of FIG. 7, a method implementing the cost calculation instructions 700 may begin execution at step 710, where a computing system is programmed to receive input data comprising an order to provide a quantity of one or more finished goods to a site through a supply chain network, the one or more finished goods each comprising one or more raw materials.

At step 720 the computing system is programmed to access information that defines an architecture of the supply chain network comprising a plurality of sites, wherein the information comprises a location of each of the plurality of sites.

At step 730, the computing system is programmed to enumerate, based on the input data and the architecture, one or more path solutions along the supply chain network to fulfill the order, wherein each path solution comprises a plurality of path fragments connecting two sites of the plurality of sites, wherein a path fragment defines a movement of a sub-quantity of the one or more finished goods or the one or more raw materials between two sites.

At step 740, the computing system is programmed to determine a cost associated with each of the plurality of path fragments, wherein the cost comprises a duty rate, wherein the duty rate associated with a particular path fragment is based on the locations of the two sites connected by the particular path fragment and the sub-quantity of the one or more finished goods or one or more finished goods raw materials moved between the two sites.

At step 750, the computing system is programmed to determine one or more optimal path solutions based on the determined cost associated with the one or more path fragments comprising each enumerated path solutions.

At step 760, the computing system is programmed to output the one or more optimal path solutions for display on a client device.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for determine one or more optimal path solutions based on the determined cost associated with the one or more path fragments including the particular steps of the method of FIG. 7, this disclosure contemplates any suitable method for determine one or more optimal path solutions based on the determined cost associated with the one or more path fragments including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
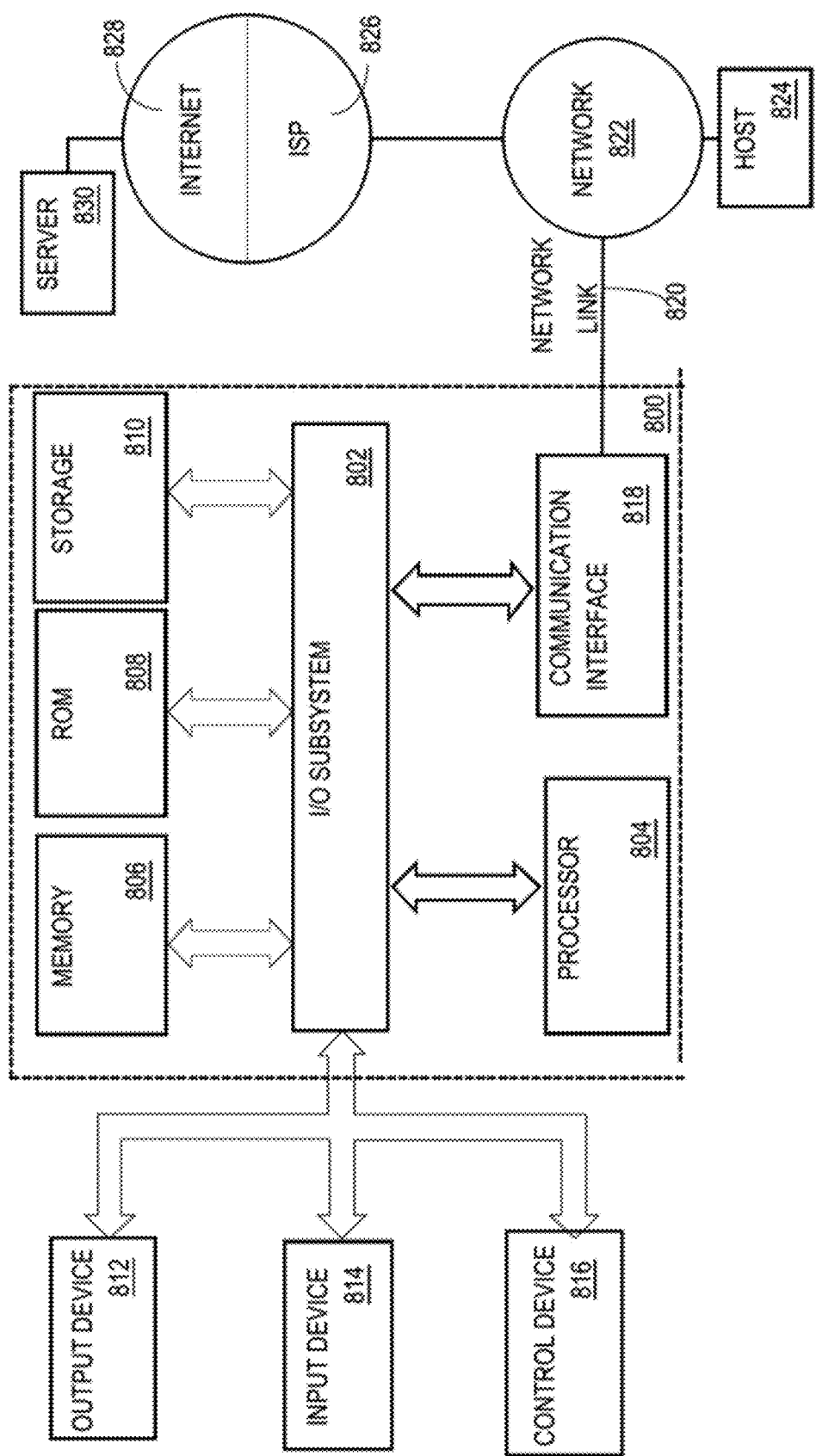
FIG. 8 is a block diagram that illustrates an example computer system with which an embodiment may be implemented.

FIG. 8 illustrates a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage devices coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on an output device 812 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host computer 824 or server computer 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to I/O subsystem 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server computer 830 broadly represents any computer, data center, virtual machine or virtual computing instance with or without a hypervisor, or computer executing a containerized program system such as DOCKER or KUBERNETES. Server computer 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server computer 830 may form elements of a distributed computing system that includes other computers, a processing cluster, server farm or other organization of computers that cooperate to perform tasks or execute applications or services. Server computer 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820 and communication interface 818. In the Internet example, a server computer 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

4. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using one or more processors, the method comprising:
receiving input data comprising an order to provide a quantity of one or more finished goods to a site through a supply chain network, the one or more finished goods each comprising one or more raw materials;
accessing information that defines an architecture of the supply chain network comprising a plurality of sites, wherein the information comprises a location of each of the plurality of sites, the input data and information being stored in working copies of tables in computer memory;
decomposing, by the processors, the supply chain network into one or more sub-networks to reduce a computer memory requirement prior to an enumeration of path solutions, wherein a number of sub-networks is based on a number of common raw materials of the one or more raw materials;
detecting, by the processors, one or more loops in the supply chain network, wherein a loop comprises a plurality of path fragments connecting two or more sites in a circular manner;
prior to enumeration of one or more path solutions, eliminating one or more of the detected loops to reduce model processing deadlocks or errors;
enumerating, by the processors and based on the input data and the architecture, the one or more path solutions along the supply chain network or along the one or more sub-networks to fulfill the order, wherein each enumerated path solution comprises a set of one or more path fragments, wherein each path fragment associated with an enumerated path solution defines a movement of a sub-quantity of the one or more finished goods or the one or more raw materials between two sites of the plurality of sites;
generating, during the enumeration of the path solutions, by the computer-implemented method and based on a heuristic approach, a subset of possible path solutions to fulfill the order;
filtering, during or after the enumeration of the path solutions, one or more invalid path fragments based on one or more site constraints or predetermined criteria, to further decrease a number of possible path solutions to fulfill the order;
dynamically releasing computer memory associated with the one or more invalid path fragments to reduce the computer memory requirement;
determining a cost associated with each path fragment associated with each enumerated path solution based on respective locations of the two sites connected by the respective path fragment and the sub-quantity of the one or more finished goods or one or more finished goods raw materials moved between the two sites;
determining one or more optimal path solutions based on the subset of possible path solutions generated during the enumeration and the determined cost associated with each path fragment associated with each enumerated path solution; and
outputting the one or more optimal path solutions for display on a client device.

2. The method of claim 1, wherein the cost associated with each path fragment is determined by a network optimization model, the model comprising one or more linear equation models.

3. The method of claim 1, further comprising generating a finished good network for a first site in the plurality of sites, wherein the finished good network is based on the one or more sub-networks.

4. The method of claim 1, wherein the input data further comprises the one or more predetermined criteria, wherein the outputted one or more optimal path solutions are ranked based on the one or more predetermined criteria.

5. The method of claim 4, further comprising prior to outputting the one or more optimal path solutions, removing one or more of the optimal path solutions based on the one or more predetermined criteria.

6. The method of claim 1, wherein the eliminating of the one or more loops in the supply chain network further comprises:
assigning an influence value to each of the two or more sites in the supply chain network in a circular manner; and
generating a path from a first site of the two or more sites to a second site of the two or more sites with a highest influence value.

7. The method of claim 1, wherein the input data further comprises an override duty rate, wherein the cost is further based on the override duty rate.

8. One or more computer-readable non-transitory storage media embodying software that is operable when executed to:
receive input data comprising an order to provide a quantity of one or more finished goods to a site through a supply chain network, the one or more finished goods each comprising one or more raw materials;
access information that defines an architecture of the supply chain network comprising a plurality of sites, wherein the information comprises a location of each of the plurality of sites, the input data and information being stored in working copies of tables in computer memory;
decompose the supply chain network into one or more sub-networks to reduce a computer memory requirement prior to an enumeration of path solutions, wherein a number of sub-networks is based on a number of common raw materials of the one or more raw materials;
detect one or more loops in the supply chain network, wherein a loop comprises a plurality of path fragments connecting two or more sites in a circular manner;
prior to enumeration of one or more path solutions, eliminate one or more of the detected loops to reduce model processing deadlocks or errors;
enumerate, based on the input data and the architecture, the one or more path solutions along the supply chain network or along the one or more sub-networks to fulfill the order, wherein each enumerated path solution comprises a set of one or more path fragments, wherein each path fragment associated with an enumerated path solution defines a movement of a sub-quantity of the one or more finished goods or the one or more raw materials between two sites of the plurality of sites;
generate, during the enumeration of the path solutions, by a computer-implemented method and based on a heuristic approach, a subset of possible path solutions to fulfill the order;
filter, during or after the enumeration of the path solutions, one or more invalid path fragments based on one or more site constraints or predetermined criteria, to further decrease a number of possible path solutions to fulfill the order;

dynamically release computer memory associated with the one or more invalid path fragments to reduce the computer memory requirement;

determine a cost associated with each path fragment associated with each enumerated path solution based on respective locations of the two sites connected by the respective path fragment and the sub-quantity of the one or more finished goods or one or more finished goods raw materials moved between the two sites;

determine one or more optimal path solutions based on the subset of possible path solutions generated during the enumeration and the determined cost associated with each path fragment associated with each enumerated path solution; and output the one or more optimal path solutions for display on a client device.

9. The media of claim 8, wherein the cost associated with each path fragment is determined by a network optimization model, the model comprising one or more linear equation models.

10. The media of claim 8, wherein the software is further operable when executed to generate a finished good network for a first site in the plurality of sites, wherein the finished good network is based on the one or more sub-networks.

11. The media of claim 8, wherein the input data further comprises the one or more predetermined criteria, wherein the outputted one or more optimal path solutions are ranked based on the one or more predetermined criteria.

12. The media of claim 8, wherein the software is further operable when executed to:
assign an influence value to the two or more sites in the supply chain network in a circular manner; and
generate a path from a first site of the two or more sites to a second site of the two or more sites with a highest influence value;
to eliminate the one or more loops in the supply chain network.

13. A system comprising:
one or more processors; and
one or more computer-readable non-transitory storage media coupled to one or more of the processors and comprising instructions operable when executed by one or more of the processors to cause the system to:
receive input data comprising an order to provide a quantity of one or more finished goods to a site through a supply chain network, the one or more finished goods each comprising one or more raw materials;
access information that defines an architecture of the supply chain network comprising a plurality of sites, wherein the information comprises a location of each of the plurality of sites, the input data and information being stored in working copies of tables in computer memory;
decompose the supply chain network into one or more sub-networks to reduce a computer memory requirement prior to an enumeration of path solutions, wherein a number of sub-networks is based on a number of common raw materials of the one or more raw materials;
detect one or more loops in the supply chain network, wherein a loop comprises a plurality of path fragments connecting two or more sites in a circular manner;

prior to enumeration of one or more path solutions, eliminate one or more of the detected loops to reduce model processing deadlocks or errors;

enumerate, based on the input data and the architecture, the one or more path solutions along the supply chain network or along the one or more sub-networks to fulfill the order, wherein each enumerated path solution comprises a set of one or more path fragments, wherein each path fragment associated with an enumerated path solution defines a movement of a sub-quantity of the one or more finished goods or the one or more raw materials between two sites of the plurality of sites;

generate, during the enumeration of the path solutions, by a computer-implemented method and based on a heuristic approach, a subset of possible path solutions to fulfill the order;

filter, during or after the enumeration of the path solutions, one or more invalid path fragments based on one or more site constraints or predetermined criteria, to further decrease a number of possible path solutions to fulfill the order;

dynamically release computer memory associated with the one or more invalid path fragments to reduce the computer memory requirement;

determine a cost associated with each path fragment associated with each enumerated path solution based on respective locations of the two sites connected by the respective path fragment and the sub-quantity of the one or more finished goods or one or more finished goods raw materials moved between the two sites;

determine one or more optimal path solutions based on the subset of possible path solutions generated during the enumeration and the determined cost associated with each path fragment associated with each enumerated path solution; and output the one or more optimal path solutions for display on a client device.

14. The system of claim 13, wherein the cost associated with each path fragment is determined by a network optimization model, the model comprising one or more linear equation models.

15. The system of claim 13, wherein the processors are further operable when executing the instructions to generate a finished good network for a first site in the plurality of sites, wherein the finished good network is based on the one or more sub-networks.

16. The system of claim 13, wherein the input data further comprises the one or more predetermined criteria, wherein the outputted one or more optimal path solutions are ranked based on the one or more predetermined criteria.

17. The system of claim 13, wherein the processors are further operable when executing the instructions to:
assign an influence value to the two or more sites in the supply chain network in a circular manner; and
generate a path from a first site of the two or more sites to a second site of the two or more sites with a highest influence value,
to eliminate the one or more loops in the supply chain network.

* * * * *